United States Patent [19]
Watts

[11] Patent Number: 5,806,803
[45] Date of Patent: Sep. 15, 1998

[54] SPACECRAFT RADIATOR COOLING SYSTEM

[75] Inventor: Keith P. Watts, Torrance, Calif.

[73] Assignee: Hughes Electronics Corporation, Los Angeles, Calif.

[21] Appl. No.: 565,570

[22] Filed: Nov. 30, 1995

[51] Int. Cl.⁶ ...................................................... B64G 1/50
[52] U.S. Cl. ............................................. 244/163; 165/41
[58] Field of Search ............................... 244/163, 158 R; 165/41, 104.14, 171

[56] References Cited

U.S. PATENT DOCUMENTS

| | | | |
|---|---|---|---|
| 1,841,762 | 1/1932 | Samesreuther et al. | 165/171 |
| 3,489,203 | 1/1970 | Fischell | 244/163 |
| 3,490,718 | 1/1970 | Vary | 244/163 |
| 3,749,156 | 7/1973 | Fletcher et al. | |
| 4,880,050 | 11/1989 | Nakamura et al. | 244/163 |
| 5,036,905 | 8/1991 | Eninger et al. | |
| 5,332,030 | 7/1994 | Spencer et al. | |
| 5,344,104 | 9/1994 | Homer et al. | |
| 5,351,746 | 10/1994 | Mackey et al. | |
| 5,372,183 | 12/1994 | Strickberger | |

Primary Examiner—Robert J. Oberleitner
Assistant Examiner—Tien Dinh
Attorney, Agent, or Firm—Elizabeth E. Leitereg; Terje Gudmestad; Michael W. Sales

[57] ABSTRACT

A heat pipe network for a satellite or spacecraft is disclosed. The network is constructed from formed and straight heat pipes securely connected together with a highly conductive material, such as Grafoil, serving as an interface gasket. The heat pipe network is interconnected to the subnadir panel and auxiliary panels, and thermally couples the North and South radiator panels. High thermal dissipating units can be mounted to heat pipes on panels attached to the main spacecraft radiator panels. The heat pipes transfer the thermal energy to the radiator panels where it is radiated to space.

15 Claims, 5 Drawing Sheets

SPACECRAFT RADIATOR COOLING SYSTEM

TECHNICAL FIELD

The present invention relates to heat pipe networks for spacecraft (a/k/a satellites).

BACKGROUND OF THE INVENTION

The present invention relates to satellite heat pipe networks and more particularly to networks which accommodate the mounting of high thermal dissipating units to heat pipes. The heat pipes transfer the thermal energy to the spacecraft radiator panels where it is radiated to space.

At the present time, spacecraft bodies are provided with a pair of radiator panels mounted on opposite sides of the spacecraft body. The radiator panels are positioned in the North and South directions and are used to dissipate heat from the electronics and other active components of the spacecraft. The radiator panels typically extend over an entire side or surface of the spacecraft body such that thermal energy is distributed over the panel in order to be more effectively radiated to space.

Due to solar effects, as well as heat caused by the internal components of the spacecraft, it is often difficult for the radiator panels to effectively dissipate heat generated inside the spacecraft body. Also, since the radiator panels are not interconnected, much of the heat dissipation is often concentrated in one of the panels.

SUMMARY OF THE INVENTION

It is an object of the present invention to provide an improved radiator and heat dissipation system for a spacecraft. It is another object of the present invention to provide a heat pipe network which allows both radiator panels on a spacecraft to be used more efficiently and effectively.

It is a further object of the present invention to provide a heat pipe network that can effectively transfer heat generated by high thermal dissipating means to the main spacecraft radiator panels in order for the thermal energy to be radiated to space. It is a still further object of the present invention to provide high conduction means for thermally connecting the auxiliary high thermal dissipating units to the radiator panels and heat dissipation system.

These and other objects and purposes are met by the present invention which utilizes a novel satellite heat pipe network and which allows high thermal dissipating units to be mounted directly or indirectly to heat pipes on panels adjacent to and attached to the main spacecraft radiator panels. The heat pipes transfer the thermal energy to the radiator panels where it is radiated to space.

The heat pipe network is constructed of a plurality of self-contained heat pipe vessels tightly connected together with a highly conductive material, such as Grafoil, positioned as an interface gasket. The network provides radiator coupling between the North and South radiator panels of the spacecraft and allows energy to be transferred from one radiator panel to to provide more effective and efficient cooling of the spacecraft.

With the present invention, a plurality of heat pipe vessels are provided which provide multiple paths for heat transport around the spacecraft. This again provides for more effective cooling and is more tolerant for heat pipe failures.

The present invention allows a plurality of high thermal dissipating units, such as high power amplifiers, to be positioned on the East and West sides of the spacecraft resulting in lower RF (radio frequency) energy losses. Various high power dissipating units can be utilized, whether conductively cooled or radiatively cooled.

With direct mounting of the dissipating units to the heat pipes, prior methods of RTV (room temperature vulcanizing) bonding are unnecessary. Previous methods of directly bonding high thermally dissipating units to composite panels were susceptible to dis-bonding because of problems with the inserts.

A BRIEF DESCRIPTION OF THE DRAWINGS

Figure 3:
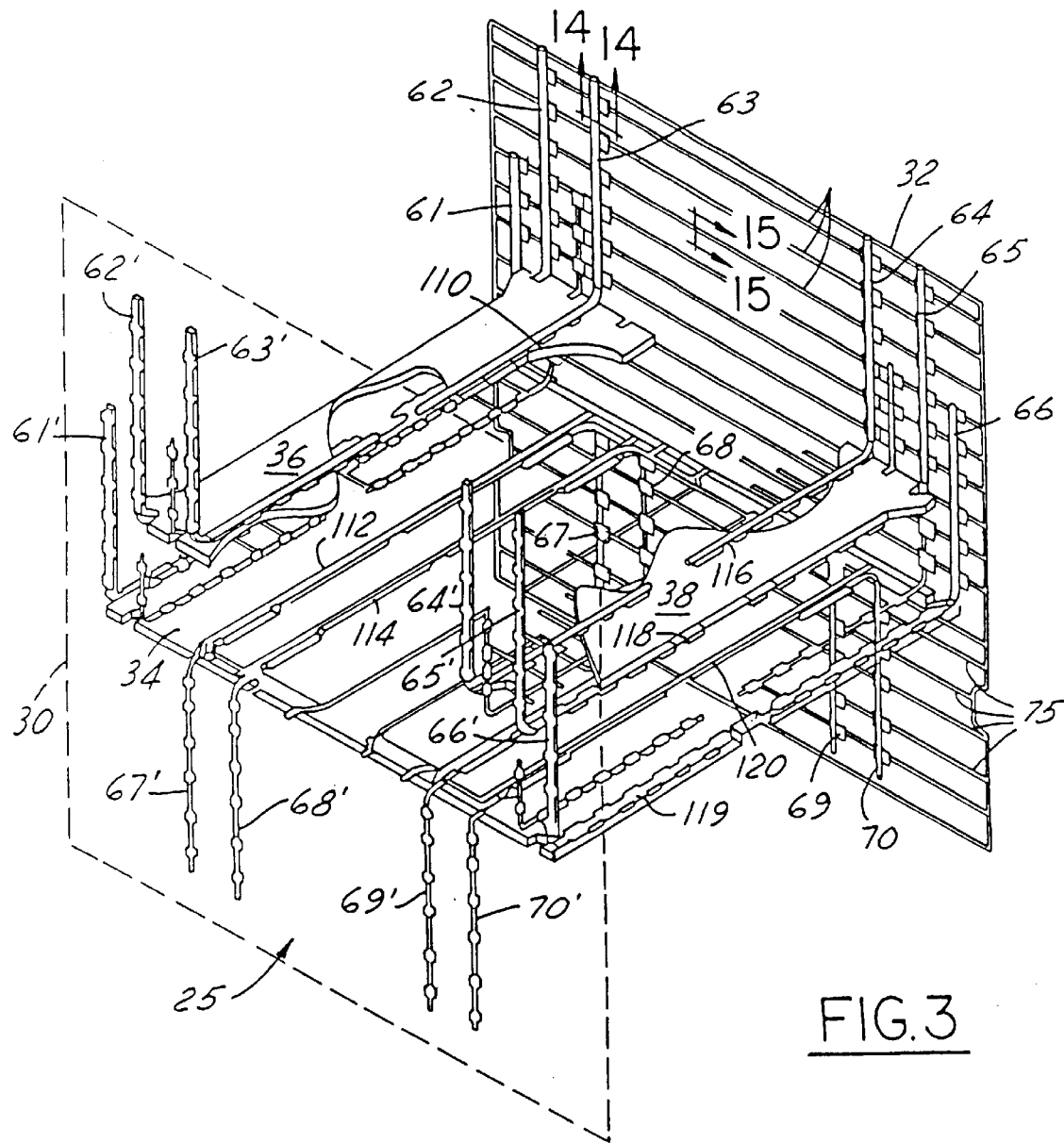
FIG. 3 illustrates an isometric view of a heat pipe network in accordance with the present invention.
Figure 10:
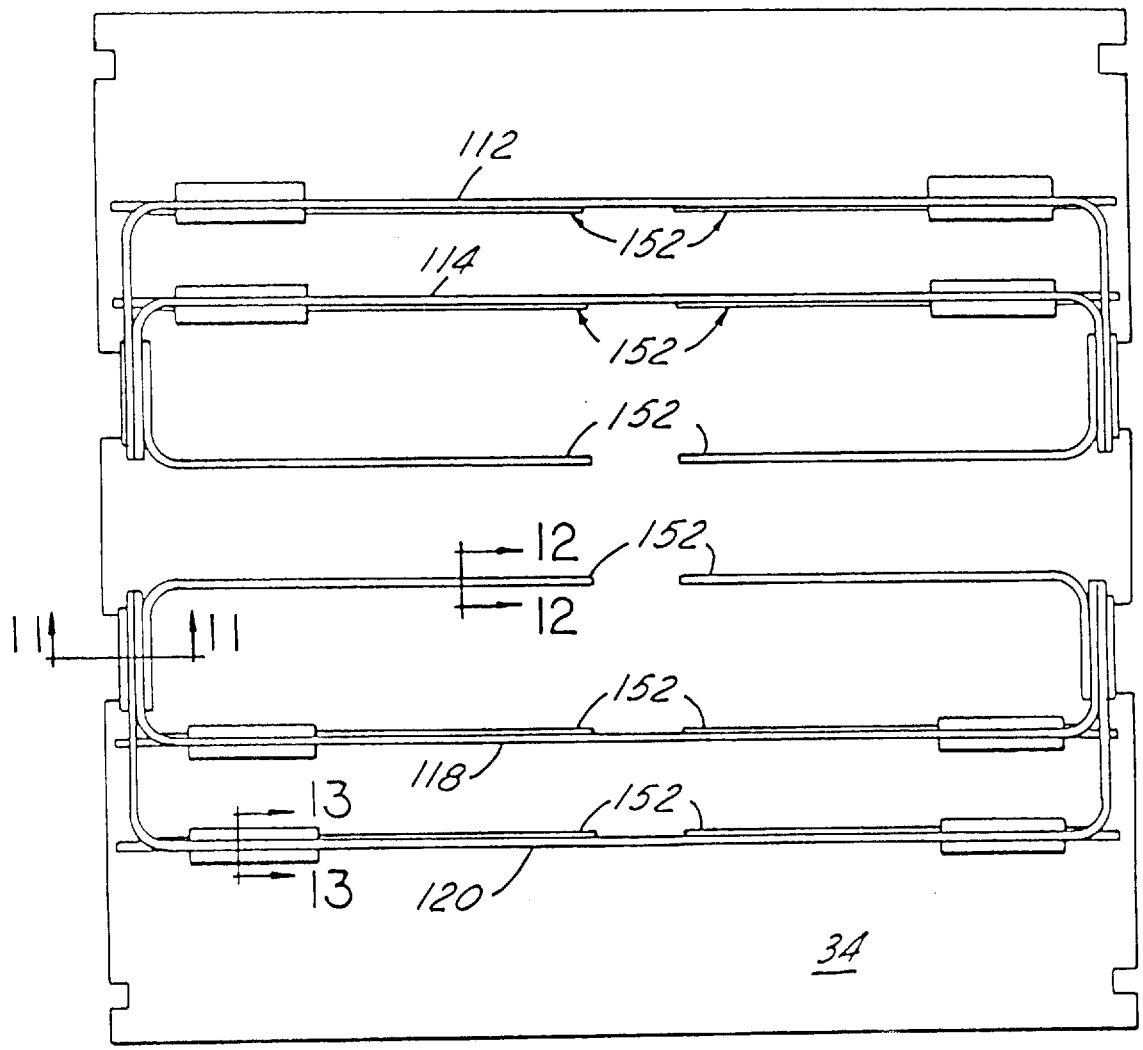
FIG. 10 is an elevational view of a subnadir panel in accordance with the present invention.
Figure 11:
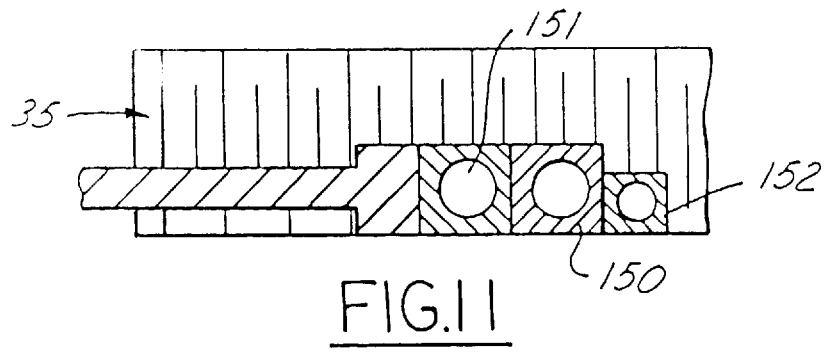
Figure 12:
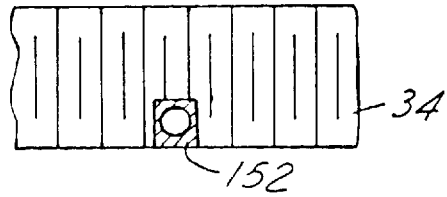
Figure 13:
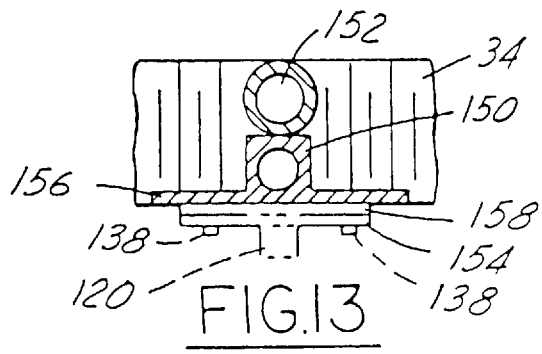
Figure 14:
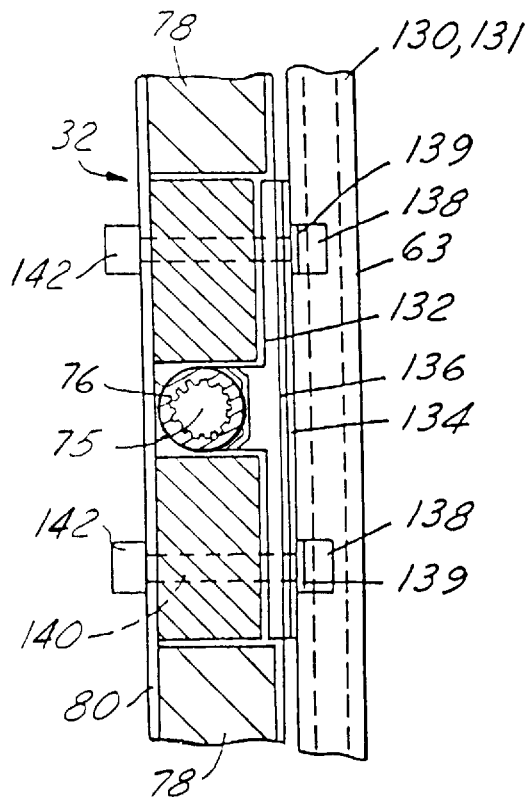
Figure 15:
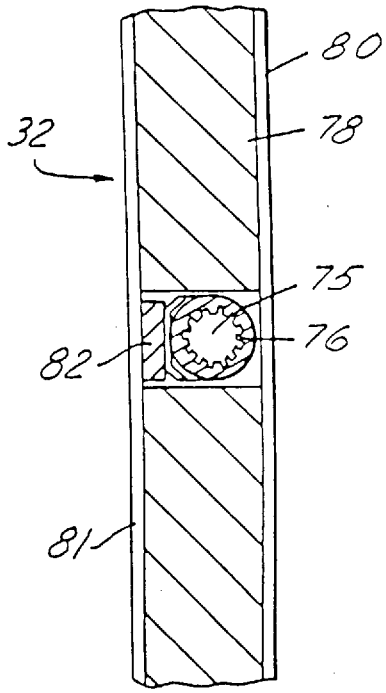

FIGS. 11—13 are cross sections of various heat pipe constructions, the cross sections being taken along lines 11—11, 12—12 and 13—13, respectively, in FIG. 10; and FIGS. 14 and 15 illustrate cross sections of a radiator panel in accordance with the present invention, the cross sections being taken along lines 14—14 and 15—15, respectively, in FIG. 3.

DESCRIPTION OF THE PREFERRED EMBODIMENT

Figure 1:
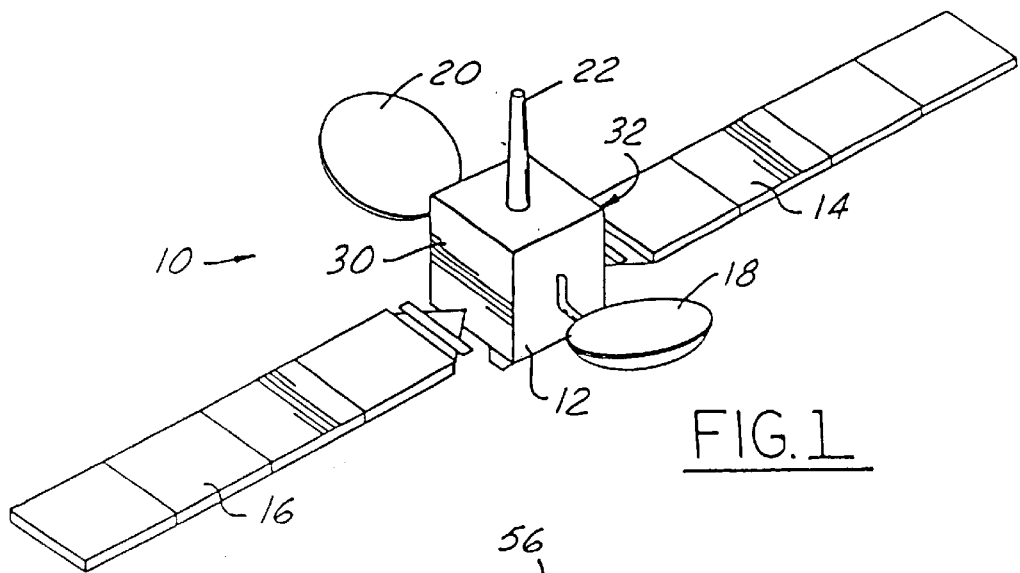
FIG. 1 depicts a spacecraft utilizing the present invention.

A typical satellite or spacecraft with which the present invention can be used is shown in FIG. 1 and designated generally by the reference numeral 10. The spacecraft 10 has a body 12, a pair of solar arrays 14 and 16, a pair of main antennas 18 and 20, and an omnidirectional antenna 22. A typical spacecraft will also have a number of other appendages, such as receiver antennas, subreflectors, nadir feeds, and the like, all of which are not shown in the drawings for simplicity reasons.

The antennas 18 and 20 are the main antennas for transmitting signals to the ground. The omnidirectional antenna 22 is adapted to be pointed at the earth station. The solar arrays 14 and 16 are covered by a plurality of solar panels on the side facing the sun and provide the necessary energy for operation of the spacecraft.

A pair of radiator panels 30 and 32 are provided on the exterior of two of the sides of the spacecraft body 12 in order to dissipate heat and thus cool the spacecraft. The radiator panels 30 and 32 are positioned on the "North" and "South" sides of the spacecraft body 12 and are not in direct view of the sun. The main antennas 18 and 20 are positioned on what are known as the "East" and "West" sides of the spacecraft body.

The spacecraft also has a number of attitude control thrusters (not shown) and the body 12 is typically covered by a thermal blanket on surfaces not occupied by a radiator panel.

Figure 2:
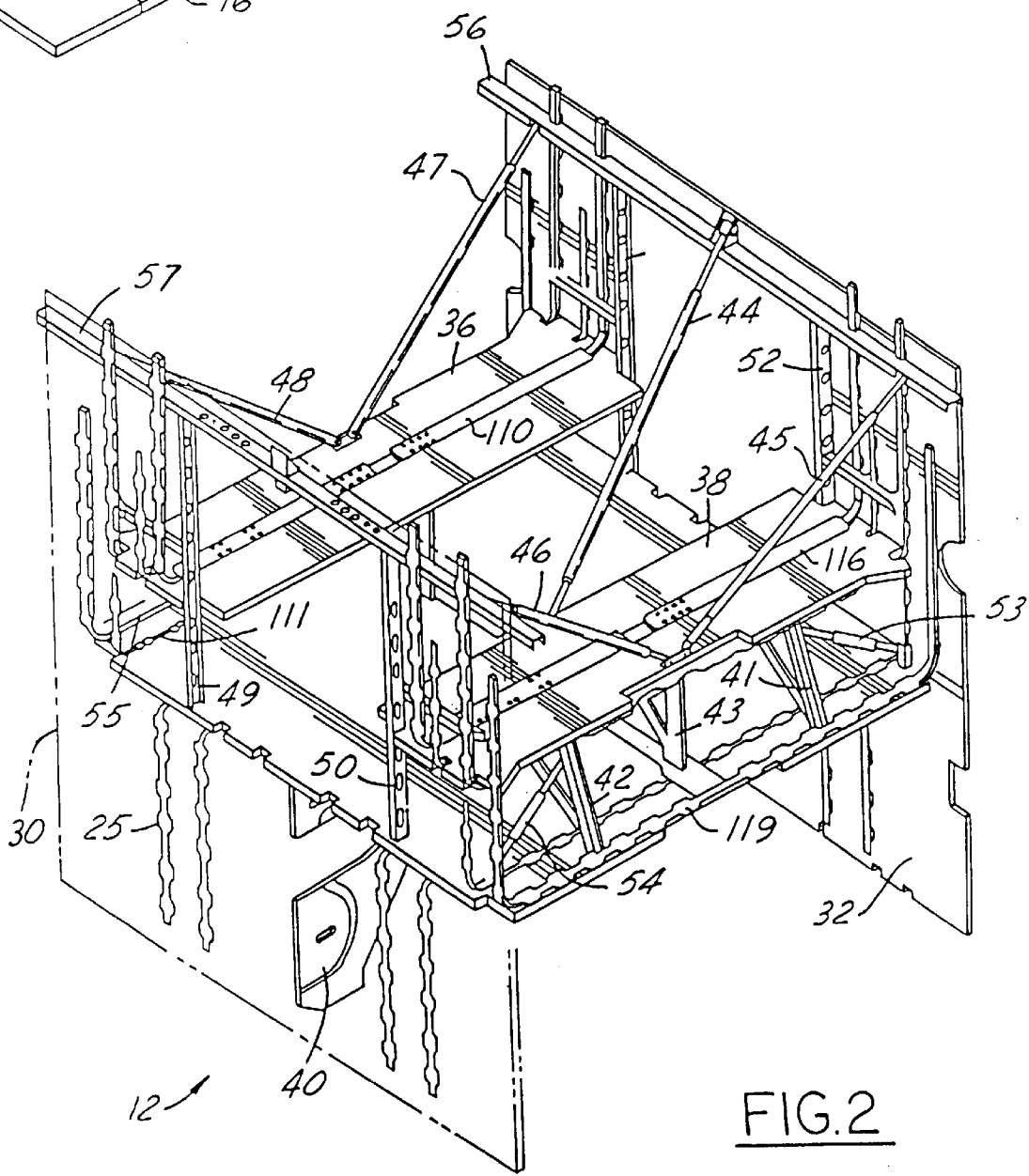
FIG. 2 is a partial perspective of a pay load module structure in a spacecraft depicting the use of the present invention.

FIG. 2 is a partial perspective view of the interior of the spacecraft body 12. Only the portions of the interior of the spacecraft body are shown which are necessary to show the positioning and structure of the present inventive heat pipe network. In this regard, the heat pipe network is generally designated by the reference numeral 25.

In FIG. 2, one of the radiator panels 32 is shown. (The other radiator panel 30 is shown in phantom lines.) Also shown is the subnadir panel 34, a pair of auxiliary panels 36 and 38, and a vertical shear panel 40. The subnadir panel 34 is typically positioned approximately midway in the spacecraft body 12. Much of the electronics, instruments and portions of the control systems for the spacecraft are typically positioned on and attached to the subnadir panel 34. The two auxiliary panels 36 and 38 are present for the same purpose and also typically support some of the electronics and instruments.

In the portion of the spacecraft body 12 occupied by the vertical shear panel 40, a number of other various spacecraft components are typically positioned, such as the propellant tank, bus module, liquid apogee engine, bus panel, battery packs and the like (not shown).

The portion of the spacecraft body in which the auxiliary panels 36 and 38 are positioned, also contains the following components: V-brackets 41 and 42, midspan support 43, payload strut 44, forward struts 45, 46, 47 and 48, vertical stiffener members 49, 50, 51, and 52, auxiliary panel braces 53, 54 and 55 and horizontal stiffeners 56 and 57. All of these components are made of conventional spacecraft lightweight materials and are preferably provided in the sizes and shapes shown.

A perspective isometric view of the heat pipe network 25 in accordance with the present invention is shown in FIG. 3. The network 25 includes a plurality of vertical heat pipe members 61, 62, 63, 64, 65, 66, 67, 68, 69 and 70, all of which are secured to the radiator panel 32. A corresponding set of vertical heat pipe members 61'–70' are also provided and are attached to radiator panel 30. Radiator panel 32 (as well as corresponding radiator panel 30) has a series of horizontally disposed internal heat pipe members 75. In this regard, a typical cross section through one of the heat pipe members 75 and a portion of the radiator panel 32 is shown in FIG. 15. As shown in FIG. 15, the heat pipe member 75, as well as all the other heat pipe members in the heat pipe network 25, comprise hollow tubular members with a plurality of fins or splines 76. The radiator panel 32 is typically made from a honeycomb material 78. The honeycomb cellular core 78 is covered by a thin face sheet of aluminum material 80 which is secured to the core by an appropriate adhesive. Typically, a highly reflective film or plurality of reflective mirrors are positioned on the external side of the radiator panels (not shown).

The heat pipes 75 are secured in place in the radiator panels. The honeycomb portions of the radiator are typically held together by forming tape adhesive bonding 81. Also, a small portion of cellular core material 82 is positioned adjacent the heat pipe member 75 in the radiator panel.

Each of the heat pipe members in the radiator panels and in the heat pipe network are closed self-contained conventional heat pipe vessels known in the art. These closed pressure vessels have no moving parts and are filled with a predetermined amount of an appropriate liquid material, such as ammonia. As is known in the art, the ammonia or other liquid in the heat pipe members is in a partial liquid and gas state and is transformed from one state to another depending on the heating or cooling to which it is exposed.

In the radiator panels, the heat absorbed by the heat pipe members is dissipated to the aluminum core and aluminum face sheet members and radiated into space.

Figure 4:
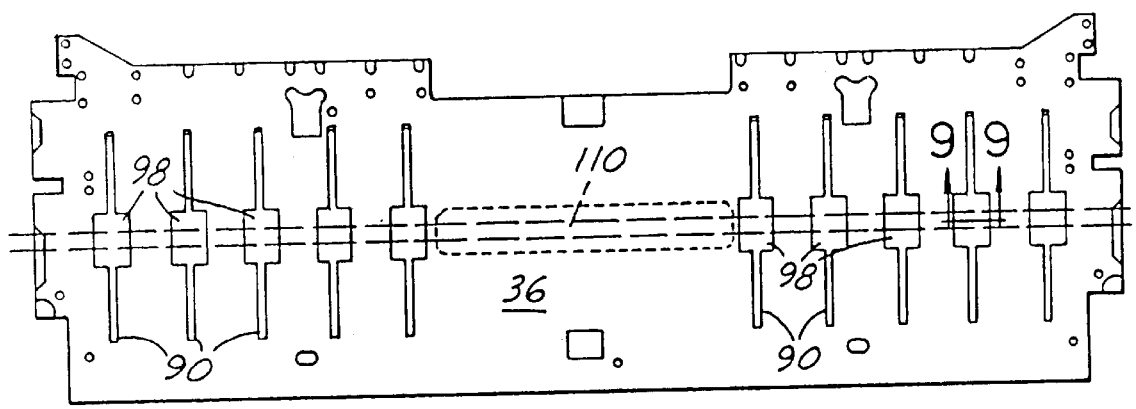
FIG. 4 illustrates an auxiliary panel in accordance with the present invention.
Figure 9:
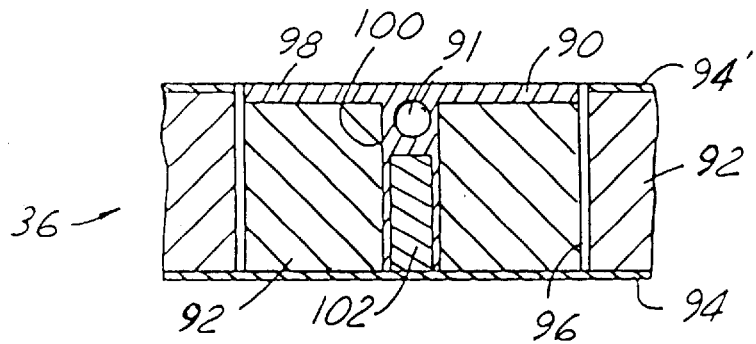
FIG. 9 is a cross-sectional view of an auxiliary panel, the cross-section being taken along lines 9—9 in FIG. 4 and in the direction of the arrows.

Each of the auxiliary panels 36 and 38 have a plurality of spreader heat pipes 90 positioned therein. This is shown in FIGS. 3 and 4. A cross section of one of the spreader heat pipe members is shown in FIG. 9. The auxiliary panel 36 has a honeycomb construction with a core 92, and aluminum face sheets 94 and 94'. The individual core members 92 are held together by forming tape 96. The heat pipe member 90 has a "T"-shaped cross section with a flat flange member 98 and a central downwardly extending ridge or flange 100 in which the heat pipe vessel 91 is positioned. A small aluminum honeycomb cell 102 is positioned below the ridge or flange 100.

The heat pipe network 25 in accordance with the present invention has a plurality of interconnecting cross members 110, 112, 114, 116, 118 and 120. These are shown in FIGS. 2 and 3. These heat pipe cross members are formed of two separate members spliced together and interconnect the vertical member portions 61–70 and 61'–70' which are attached to the external radiator panels 32 and 30, respectively. The interconnecting network provides radiator coupling between the North and South radiator panels. This is particular advantageous when one radiator panel may be less efficient due to sun loading. Energy can be transferred to the cooler radiator panel on the opposite side of the spacecraft body, thus more evenly distributing the heat in the spacecraft body.

The present invention also allows high thermal dissipating units, such as high power amplifiers to be mounted directly or indirectly to the heat pipes on panels adjacent to or attached to the main spacecraft radiator panels 30 and 32. Representative high power amplifiers are, for example, traveling wave tubes (TWT), solid state power amplifiers (SSPA), electronic power controls (EPC) and digital linear amplifiers (DLA). The heat pipe members transfer the thermal energy from such units and panels to the radiator panels where it can be radiated to space.

With the present invention, the high powered devices, such as TWTs and SSPAs, can be positioned on the East and West sides of the spacecraft body 12 close to the output multiplexer and antenna feed locations. This results in a reduction of RF energy losses. The invention is also sufficiently flexible that it can operate with either conductively cooled or radiatively cooled TWTs.

The present invention also provides additional heat pipe redundancy by providing a "ring" of heat pipes around the spacecraft body, thus providing multiple paths for heat transport. This provides a spacecraft that is more tolerant to heat pipe failures.

In known spacecrafts, high thermally dissipating units are bonded directly to composite panels, typically by RTV. These are susceptible, however, to dis-bonding because of problems with the inserts. The present invention overcomes that problem with the direct mounting of the high thermal dissipating units to the heat pipes. The inserts are replaced with bolted interfaces including the highly conductive thermal transfer members, as discussed below.

Figure 8:
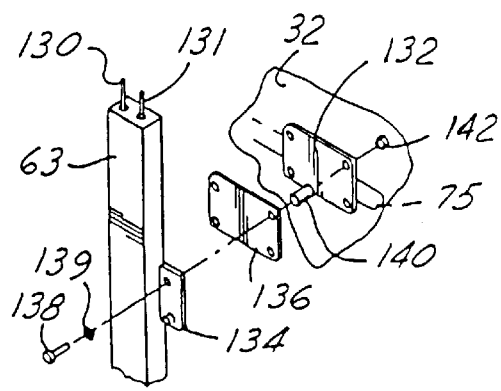

The thermal connections of the external heat pipe members 61–70 (and corresponding heat pipe members 61'–70') to the radiator panels are shown in FIGS. 8 and 14. As shown, heat pipe member 63 has a pair of heat pipe vessels 130 and 131. The radiator panel 32 has an embedded spreader heat pipe flange 132 and the heat pipe member 63 has a corresponding flange or spreader member 134. Positioned between the spreader flange members 132 and 134 is a highly conductive thermal transfer gasket 136. The gasket member 136 is preferably made of carbon graphite fibers, such as the Grafoil material from Union Carbide, but member 136 can also be made of another satisfactory or equivalent material of high thermal conductivity, such as Sigraflex. The two spreader members 132 and 134 are securely connected together with the thermal transfer member 136 inbetween by a plurality of fastener members 138. Appropriate washers 139, riv-nut sleeves 140 and riv-nut expanders 142 are used to position and secure the bolts in place.

Figure 5:
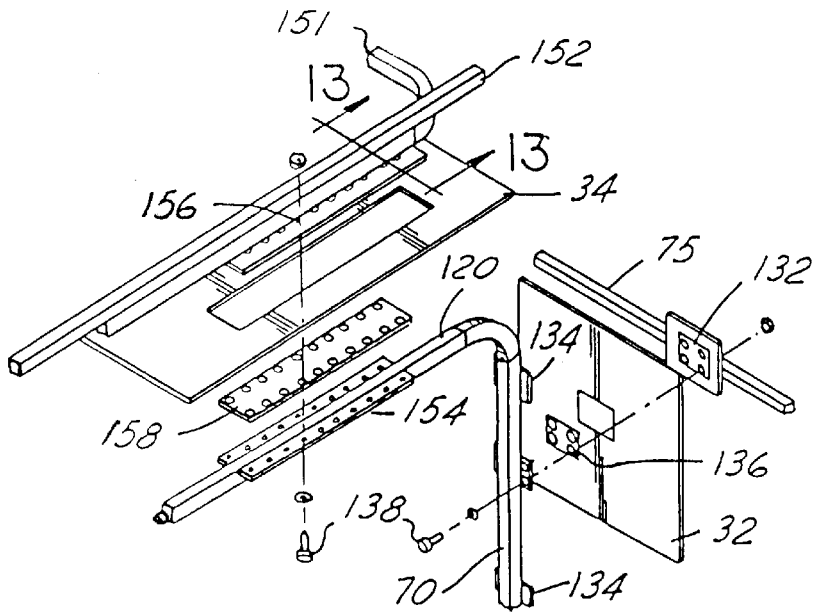
FIGS. 5–8 illustrate various heat pipe joint/connection interfaces in accordance with the present invention.
Figure 6:
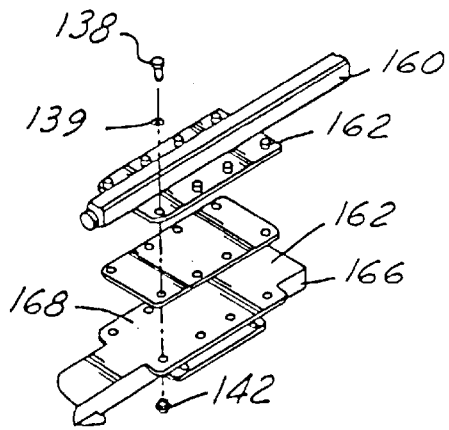
Figure 7:
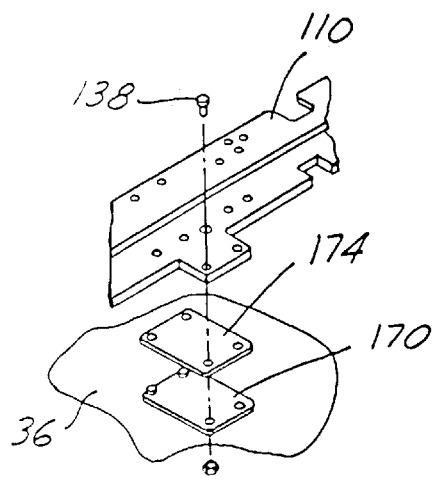

Other connection joints between heat pipes and spacecraft body members are shown in FIGS. 5, 6 and 7. In FIG. 5, vertical heat pipe member 70 and horizontal interconnecting cross member 120 are shown connected to radiator panel 32 and subnadir panel 34. In this regard, heat pipe member 70 is connected to radiator panel 32 through spreader member 134, thermal transfer member 136, and spreader flange member 132, in the same manner as described above with respect to FIGS. 8 and 14. Subnadir panel 34 has an internal or embedded single heat pipe member 151 with an elongated single heat pipe member 152 positioned adjacent thereto. A cross section through panel 34 showing the position of heat pipe members 151 and 152 is shown in FIG. 13.

Also as shown in FIGS. 5 and 13, cross connecting heat pipe member 120 has an elongated flange member 154 that mates with elongated flange member 156 on heat pipe member 150. Thermal transfer member 158 is secured between flanges 156 and 154 and the two flanges are secured together by fasteners 138 (in the same manner as discussed above with respect to FIG. 8).

The subnadir panel 34 also has a plurality of spreader heat pipe members (not shown) that are similar to spreader heat pipe members 90 positioned in auxiliary panels 36 and 38. The spreader heat pipe members in the subnadir panel 34 are positioned transverse to the cross connecting heat pipe members 112, 114, 118 and 120.

A typical joint connection between a heat pipe member and a splice joint is shown in FIG. 6. The heat pipe member 160 has a spreader or flange member 162 which is positioned over a spreader or flange member 164 on splice member 166. A thermal transfer member 168 is secured between the spreader members 162 and 164 by a plurality of fasteners 138.

A similar connection joint between an embedded internal heat pipe member in an auxiliary panel and a cross connecting heat pipe member 110 is shown in FIG. 7. The embedded heat pipe member in panel 36 has recessed spreader member 170 and the heat pipe member 110 has a corresponding flange member 172. The two spreader members 170 and 172 are connected together by a plurality of fasteners 138 with a thermal transfer member 174 positioned inbetween.

FIG. 10 shows a typical subnadir panel 34 in accordance with the present invention. A plurality of heat pipe members or vessels 152 are included in the internal structure of the honeycomb structure of the panel 34. (FIGS. 11, 12 and 13 are cross-sectional views depicting the subnadir panel structure and heat pipe locations.) In the embodiment shown in FIG. 10, twelve heat pipe members 152 are shown, although it is understood that a different number could be provided.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

It is claimed:

1. A spacecraft having a body, a pair of spaced apart generally parallel radiator panels and a first panel member positioned substantially transversely between said radiator panels, the improvement comprising:

a first plurality of heat pipe members positioned in one of said pair of radiator panels and generally parallel to said first panel member;

a second pair of heat pipe members in thermal communication with and positioned transverse to said first plurality of heat pipe members;

a third plurality of heat pipe members positioned in the other of said pair of radiator panels and generally parallel to said first panel member;

a fourth plurality of heat pipe members in thermal communication with and positioned transverse to said third plurality of heat pipe members; and a fifth plurality of heat pipe members positioned transversely between said pair of radiator panels and adjacent to said panel member, said fifth plurality of heat pipe members connected by curved heat pipe members to said second and fourth plurality of heat pipe members.

2. The spacecraft as set forth in claim 1 wherein said fifth plurality of heat pipe members are positioned in said transverse first panel member.

3. The spacecraft as set forth in claim 1 further comprising a first plurality of thermal transfer members positioned in said one of said pair of radiator panels and between said first and second plurality of heat pipe members.

4. The spacecraft as set forth in claim 3 wherein said first plurality of thermal transfer members comprise Grafoil members.

5. The spacecraft as set forth in claim 1 further comprising a second plurality of thermal transfer members positioned in said other of said pair of radiator panels and between said third and fourth plurality of heat pipe members.

6. The spacecraft as set forth in claim 5 wherein said second plurality of thermal transfer members comprise Grafoil members.

7. The spacecraft as set forth in claim 1 further comprising a sixth plurality of heat pipe members and a third plurality of thermal transfer members, said sixth plurality of heat pipe members positioned adjacent and substantially parallel to said fifth plurality of heat pipe members, and said third plurality of thermal transfer members being positioned between said fifth and sixth plurality of heat pipe members.

8. The spacecraft as set forth in claim 7 wherein said third plurality of thermal transfer members comprise Grafoil members.

9. The spacecraft as set forth in claim 1 further comprising at least one second panel member positioned transversely between said pair of radiator panels, said second panel member having a seventh plurality of heat pipe members positioned therein.

10. A radiator cooling system for a spacecraft comprising:

a first radiator panel member and a second radiator panel member positioned substantially parallel to each other in said spacecraft;

a first cross-panel member attached to and extending between said first and second radiator panel members;

a first plurality of heat pipe members positioned on said first radiator panel member;

a second plurality of heat pipe members positioned on said second radiator panel member;

a third plurality of heat pipe members positioned on said first cross-panel member and substantially transverse to said first and second plurality of heat pipe members; and a plurality of curved connector heat pipe members connecting together in heat transfer relationship said first, second and third plurality of heat pipe members.

11. The radiator cooling system of claim 10 wherein said first, second and third plurality of heat pipe members each have heat transfer flange members thereon.

12. The radiator cooling system of claim 11 further comprising thermal transfer members positioned adjacent each of said flange members.

13. The radiator cooling system of claim 10 further comprising a fourth plurality of heat pipe members positioned in said first radiator panel member and transverse to said first plurality of heat pipe members, said fourth and first plurality of heat pipe members being in thermal transfer communication with each other.

14. The radiator cooling system of claim 10 further comprising a fifth plurality of heat pipe members positioned in said second radiator panel member and transverse to said second plurality of heat pipe members, said fifth and second plurality of heat pipe members being in thermal transfer communication with each other.

15. The radiator cooling system of claim 10 further comprising a second cross-panel member extending between said first and second radiator panel members, said second cross-panel member having a plurality of heat pipe members positioned therein.

* * * * *